United States Patent
Matsuda

(10) Patent No.: US 6,873,204 B2
(45) Date of Patent: Mar. 29, 2005

(54) COMPACT DC STABILIZED POWER SUPPLY CAPABLE OF SUPPRESSING FLUCTUATION OF OUTPUT VOLTAGE IN SPITE OF ABRUPT FLUCTUATION OF LOAD CURRENT

(75) Inventor: Eishi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 09/975,054

(22) Filed: Oct. 12, 2001

(65) Prior Publication Data

US 2002/0043966 A1 Apr. 18, 2002

(30) Foreign Application Priority Data

Oct. 12, 2000 (JP) ........................................ 2000-312557

(51) Int. Cl.$^7$ ................................................. G05F 3/02
(52) U.S. Cl. ........................ 327/540; 327/538; 323/313
(58) Field of Search ................................. 327/538, 540, 327/541, 543; 323/313, 315

(56) References Cited

U.S. PATENT DOCUMENTS 4,769,784 A * 9/1988 Doluca et al. ............... 365/149
5,546,044 A * 8/1996 Calligaro et al. ............ 327/543

FOREIGN PATENT DOCUMENTS

| CN | 1116732 C | 7/2003 |
| JP | 4-359675 | 12/1992 |
| JP | 7-115770 | 5/1995 |

* cited by examiner

Primary Examiner—Terry D. Cunningham
(74) Attorney, Agent, or Firm—Young & Thompson

(57) ABSTRACT

A DC stabilized power supply 10 for converting an inputted DC power supply voltage into a predetermined DC voltage includes a converting circuit 11, a first differentiating circuit 12 for differentiating variations in an output voltage of the converter circuit 11, a current absorbing circuit 13 driven by an output voltage of the first differentiating circuit 12, a second differentiating circuit 14 for differentiating variations in the output voltage of the converter circuit 11, and a current injecting circuit 15 driven by an output voltage of the second differentiating circuit 14.

4 Claims, 2 Drawing Sheets

COMPACT DC STABILIZED POWER SUPPLY CAPABLE OF SUPPRESSING FLUCTUATION OF OUTPUT VOLTAGE IN SPITE OF ABRUPT FLUCTUATION OF LOAD CURRENT

BACKGROUND OF THE INVENTION

The present invention relates to a direct current (DC) stabilized power supply which has a DC—DC converter circuit for converting an inputted DC power supply voltage into a predetermined DC voltage.

Conventionally, such a DC stabilized power supply of the type described converts an inputted DC voltage into a predetermined DC voltage by the DC—DC converter circuit included therein and reduces fluctuations of an output voltage with respect to fluctuations of load current on the DC stabilized power supply.

In the interim, in the above-mentioned conventional DC stabilized power supply, the DC—DC converter circuit follows and responds with respect to the fluctuations of the load current, when the load current decreases or increases abruptly. However, response speed of the DC—DC converter circuit has a limit with respect to the above-mentioned fluctuations of the load current. Accordingly, in the event that the load current fluctuates at a speed exceeding the response speed of the DC—DC converter circuit, the output voltage of the DC stabilized power supply transiently fluctuates to a large extent.

In order to minimize such fluctuations of the output voltage caused by the abrupt fluctuations of the load current, an example of a DC stabilized power supply is proposed in unexamined Japanese Patent Publication No. Hei 04-359675, namely 359675/1992.

The DC stabilized power supply proposed in the unexamined Japanese Patent Publication No. Hei 04-359675 uses a voltage detection circuit having a predetermined threshold voltage value. When the output voltage from the DC stabilized power supply deviates the predetermined threshold voltage value, the DC stabilized power supply detects the deviation by the use of the voltage detection circuit. As a result, the DC stabilized power supply operates to reduce the fluctuations of the output voltage. Accordingly, in consideration of response time of the circuit of the DC stabilized power supply, it is necessary to render the predetermined threshold voltage value to have a narrow range. As mentioned above, the DC stabilized power supply has a problem that the voltage detection circuit is required. In addition thereto, the DC stabilized power supply has an another problem that a determination of the predetermined threshold voltage value is difficult.

On the other hand, an another example of a DC stabilized power supply is also proposed in unexamined Japanese Patent Publication No. Hei 07-115770, namely 115770/1995. However, in the DC stabilized power supply proposed in the unexamined Japanese Patent Publication No. Hei 07-115770, a secondary power converter circuit is required. This causes a problem that the circuit becomes large in size. In addition, as an another problem, a large loss is inevitably caused to occur in the secondary power converter circuit, even though load current is not fluctuated in the DC stabilized power supply.

SUMMARY OF THE INVENTION

It is therefore an object of the present invention to provide a compact DC stabilized power supply which is capable of suppressing transient fluctuations of the output voltage down to not more than a certain level, even though the load current is abruptly fluctuated therein.

Other objects of the present invention will become clear as the description proceeds.

According to an aspect of the present invention, there is provided a DC stabilized power supply for use in converting an inputted DC power supply voltage into a predetermined DC voltage, comprising: a converter circuit; a first differentiating circuit for differentiating variations in an output voltage of the converter circuit; and a current absorbing circuit driven by an output voltage of the first differentiating circuit.

Providing the DC stabilized power supply with a composition as mentioned above, the output voltage of the converter circuit rises transiently due to an abrupt decrease of load current of load connected to an output of the DC stabilized power supply. Accordingly, in response to the fluctuations of the output voltage of the converter circuit, variations in the output voltage of the first differentiating circuit become greater as the fluctuations of the output voltage become larger.

Therefore, the current absorbing circuit absorbs current incident to an output of the converter circuit by operating based on the output voltage of the first differentiating circuit. Accordingly, transient rises of the output voltage of the converter circuit due to abrupt decreases of the load current in excess of follow-up operations of the converter circuit can be suppressed.

According to another aspect of the present invention, there is also provided a DC stabilized power supply for use in converting an inputted DC power supply voltage into a predetermined DC voltage, comprising: a converter circuit; a second differentiating circuit for differentiating variations in an output voltage of the converter circuit; and a current injecting circuit driven by an output voltage of the second differentiating circuit.

Providing the DC stabilized power supply with a composition as mentioned above, the output voltage of the converter circuit drops transiently due to an abrupt increase of load current of load connected to an output of the DC stabilized power supply. Accordingly, in response to the fluctuations of the output voltage of the converter circuit, variations in the output voltage of the second differentiating circuit become greater as the fluctuations of the output voltage become larger.

Therefore, the current injecting circuit injects current into the output of the converter circuit by operating based on the output voltage of the second differentiating circuit. Accordingly, transient drops of the output voltage of the converter circuit due to abrupt increases of the load current in excess of follow-up operations of the converter circuit can be suppressed.

According to still another aspect of the present invention, there is also provided a DC stabilized power supply for use in converting an inputted DC power supply voltage into a predetermined DC voltage, comprising: a converter circuit; a first differentiating circuit for differentiating variations in an output voltage of the converter circuit; a current absorbing circuit driven by an output voltage of the first differentiating circuit; a second differentiating circuit for differentiating variations in the output voltage of the converter circuit; and a current injecting circuit driven by an output voltage of the second differentiating circuit.

Providing the DC stabilized power supply with a composition as mentioned above, the output voltage of the converter circuit rises transiently due to an abrupt decrease of load current of load connected to an output of the DC stabilized power supply. Accordingly, in response to the fluctuations of the output voltage of the converter circuit, variations in the output voltage of the first differentiating circuit become greater as the fluctuations of the output voltage become larger. And output voltage of the converter circuit drops transiently due to an abrupt increase of the load current of the load connected to the output of the DC stabilized power supply. Accordingly, in response to the fluctuations of the output voltage of the converter circuit, variations in the output voltage of the second differentiating circuit become greater as the fluctuations of the output voltage become larger.

Therefore, the current absorbing circuit absorbs current incident to an output of the converter circuit by operating based on the output voltage of the first differentiating circuit. And the current injecting circuit injects current into the output of the converter circuit by operating based on the output voltage of the second differentiating circuit. Accordingly, transient rises of output voltage of the converter circuit due to abrupt decreases of load current and transient drops of the output voltage of the converter circuit due to abrupt increases of the load current in excess of follow-up operations of the converter circuit can be suppressed concurrently.

In the DC stabilized power supply, the converter circuit may output a control signal to the first differentiating circuit or the second differentiating circuit to stop an operation of the first differentiating circuit or the second differentiating circuit, when the DC stabilized power supply is starting or stopping.

Providing the DC stabilized power supply with a composition as mentioned above, in the event that fluctuations of the output voltage occur in the converter circuit when starting and stopping of the DC stabilized power supply, it becomes possible to prevent the first differentiating circuit or the second differentiating circuit from operating the current absorbing circuit or the current injecting circuit by detecting the fluctuations of the output voltage.

In the DC stabilized power supply, the converter circuit may output a control signal to the current absorbing circuit to stop an operation of the current absorbing circuit, when the DC stabilized power supply is starting or stopping.

Providing the DC stabilized power supply with a composition as mentioned above, in the event that fluctuations of the output voltage occur in the converter circuit when starting and stopping of the DC stabilized power supply, it becomes possible to prevent the first differentiating circuit or the second differentiating circuit from operating the current absorbing circuit by detecting the fluctuations of the output voltage.

In the DC stabilized power supply, the converter circuit may output a control signal to the current injecting circuit to stop an operation of the current injecting circuit, when the DC stabilized power supply is starting or stopping.

Providing the DC stabilized power supply with a composition as mentioned above, in the event that fluctuations of the output voltage occur in the converter circuit when starting and stopping of the DC stabilized power supply, it becomes possible to prevent the first differentiating circuit or the second differentiating circuit from operating the current injecting circuit by detecting the fluctuations of the output voltage.

DETAILED DESCRIPTION OF THE PREFERRED EMBODIMENTS

Figure 1:
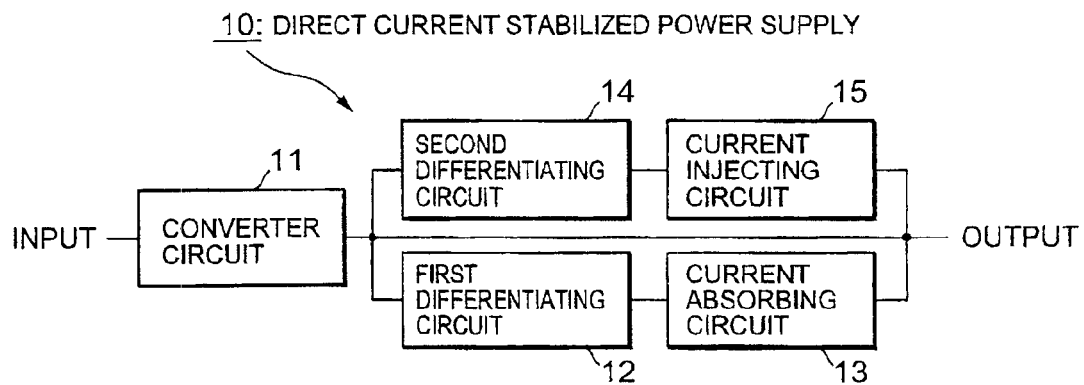
FIG. 1 is a schematic block diagram for showing a composition of a DC stabilized power supply according to a first embodiment of the present invention.

Now, referring to FIG. 1, description is made about a DC stabilized power supply according to a first embodiment of the present invention. FIG. 1 is a schematic block diagram for showing a composition of the DC stabilized power supply according to the first embodiment of the present invention.

As shown in FIG. 1, the DC stabilized power supply 10 comprises a converter circuit 11, a first differentiating circuit 12, a current absorbing circuit 13, a second differentiating circuit 14, and a current injecting circuit 15.

The above-mentioned converter circuit 11 is composed to convert an inputted DC power supply voltage into a predetermined DC voltage, i.e., is a DC—DC converter.

The output voltage of the converter circuit 11 is inputted to the first differentiating circuit 12. The first differentiating circuit 12 thereby outputs an output voltage corresponding to fluctuations of the output voltage of the converter circuit 11. That is, the fluctuations of the output voltage of the converter circuit 11 become larger, change of the output voltage of the first differentiating circuit 12 becomes greater.

The current absorbing circuit 13 is driven by a positive output voltage of the first differentiating circuit 12. The current absorbing circuit 13 thereby absorbs current with respect to the output of the converter circuit 11. The output voltage of the converter circuit 11 is also inputted to the second differentiating circuit 14. The second differentiating circuit 14 thereby outputs an output voltage corresponding to fluctuations of the output voltage of the converter circuit 11. That is, the fluctuations of the output voltage of the converter circuit 11 become larger, change of the output voltage of the second differentiating circuit 14 becomes greater.

The current injecting circuit 15 is driven by a negative output voltage of the second differentiating circuit 14. The current injecting circuit 15 thereby injects current into the output of the converter circuit 11.

Next, description will proceed to an operation of the DC stabilized power supply 10 according to this embodiment of the present invention.

In the event that the DC power supply voltage is inputted to the converter circuit 11 from the outside thereof, the converter circuit 11 converts the inputted DC power supply voltage into a predetermined DC voltage and supplies the DC voltage to the output thereof. Thus, the predetermined DC voltage is outputted to the load connected to the output of the converter circuit 11.

Herein, in the event that the load current flowing through the load is decreased abruptly, the output voltage of the converter circuit 11 is risen transiently. At this time, the output voltage from the first differentiating circuit 12 is increased in positive value based on the abrupt rise of the output voltage of the converter circuit 11. The increased output voltage from the first differentiating circuit 12 is outputted to the current absorbing circuit 13.

Thus, the current absorbing circuit 13 absorbs current with respect to the output from the converter circuit 11 by being driven based on the output voltage of the first differentiating circuit 12. Therefore, the rise of the output voltage of the converter circuit 11 can be suppressed.

On the other hand, in the event that the load current flowing through the load is increased abruptly, the output voltage of the converter circuit 11 is dropped transiently. At this time, the output voltage from the second differentiating circuit 14 is decreased in negative value based on the abrupt drop of the output voltage of the converter circuit 11. The decreased output voltage from the second differentiating circuit 14 is outputted to the current injecting circuit 15.

Thus, the current injecting circuit 15 injects current with respect to the output from the converter circuit 11 by being driven based on the output voltage of the second differentiating circuit 14. Therefore, the drop of the output voltage of the converter circuit 11 can be suppressed.

Consequently, in the DC stabilized power supply 10 according to this embodiment, the output voltage of the converter circuit 11 increases or decreases transiently, when the load current of the load connected to the output thereof fluctuates abruptly. At that time, the output voltages from the first differentiating circuit 12 and the second differentiating circuit 14 vary based on the fluctuations of the output voltage of the converter circuit 11. The current absorbing circuit 13 or the current injecting circuit 15 is driven based on the output voltage of the first differentiating circuit 12 or the second differentiating circuit 14. As a result, the rise or the drop of the output voltage of the converter circuit 11 can be suppressed.

Therefore, fluctuations of the output voltage of the converter circuit 11 can be suppressed by operations of the above-mentioned first differentiating circuit 12, second differentiating circuit 14, current absorbing circuit 13, and current injecting circuit 15, even though the abrupt fluctuation of the load current exceeding a follow-up speed of the converter circuit 11 is caused to occur.

Figure 2:
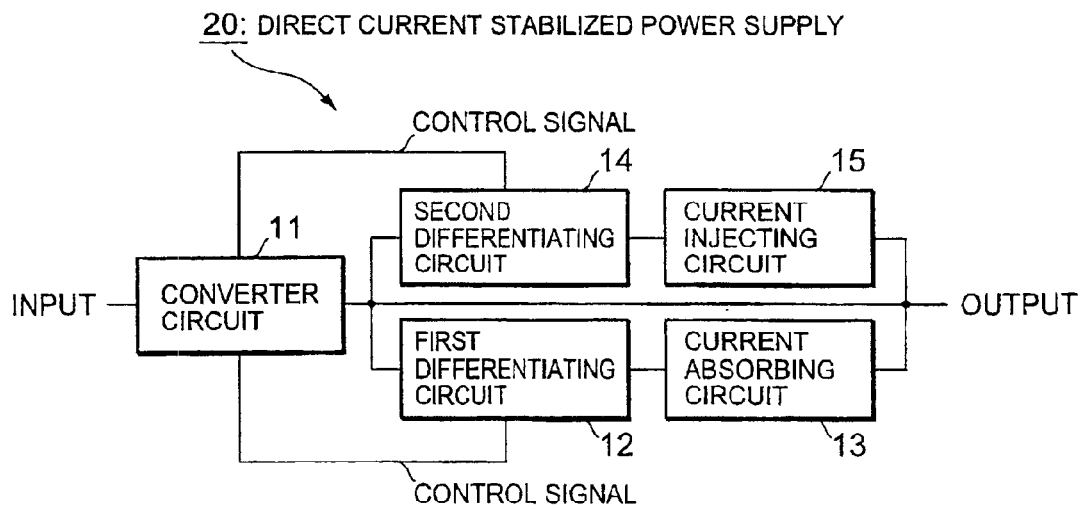
FIG. 2 is a schematic block diagram for showing a composition of a DC stabilized power supply according to a second embodiment of the present invention.

Referring now to FIG. 2, description proceeds to a DC stabilized power supply according to a second embodiment of the present invention. In FIG. 2, illustrated is a composition of the DC stabilized power supply according to the second embodiment of the present invention.

The DC stabilized power supply 20 shown in FIG. 2 has a structure similar to that of the DC stabilized power supply 10 shown in FIG. 1 except for some points described below. Therefore, similar portions are numbered by like reference numerals, and description about the similar portions is omitted accordingly.

In FIG. 2, the DC stabilized power supply 20 has a composition in which control signals, that is, a start signal and a stop signal are transmitted from the converter circuit 11 to the first differentiating circuit 12 and the second differentiating circuit 14, respectively, when the DC stabilized power supply 20 is starting or stopping.

Further, the first differentiating circuit 12 and the second differentiating circuit 14 are composed to stop operations thereof during a predetermined time to make the output voltages therefrom be null or to cut-off the outputs thereof, when the above-mentioned control signals are inputted from the converter circuit 11.

According to the above-mentioned composition of the DC stabilized power supply 20, in the same manner as the DC stabilized power supply 10 illustrated in FIG. 1, when the DC power supply voltage is inputted to the converter circuit 11 from the outside thereof, the converter circuit 11 converts the inputted DC power supply voltage into a predetermined DC voltage and supplies the DC voltage to the output thereof. When the load current of the load connected to the output thereof fluctuates abruptly, transient rise or drop of the output voltage of the converter circuit 11 are detected by the first differentiating circuit 12 and the second differentiating circuit 14. As a result, the rise or the drop of the output voltage of the converter circuit 11 is suppressed by driving the current absorbing circuit 13 or the current injecting circuit 15 based on the output voltage of the first differentiating circuit 12 or the second differentiating circuit 14.

Further, in the DC stabilized power supply 20, even in the event that the output voltage of the converter circuit 11 fluctuates, when the DC stabilized power supply 20 is starting or stopping, the first differentiating circuit 12 and the second differentiating circuit 14 stop operations thereof during a predetermined time. This is because the control signal, that is, a start signal or a stop signal is transmitted from the converter circuit 11 to the first differentiating circuit 12 or the second differentiating circuit 14, respectively. Therefore, the current absorbing circuit 13 or the current injecting circuit 15 is never subjected to malfunction, even though the fluctuation of the output voltage of the converter circuit 11 at the starting time or the stopping time is detected by the first differentiating circuit 12 or the second differentiating circuit 14.

Figure 3:
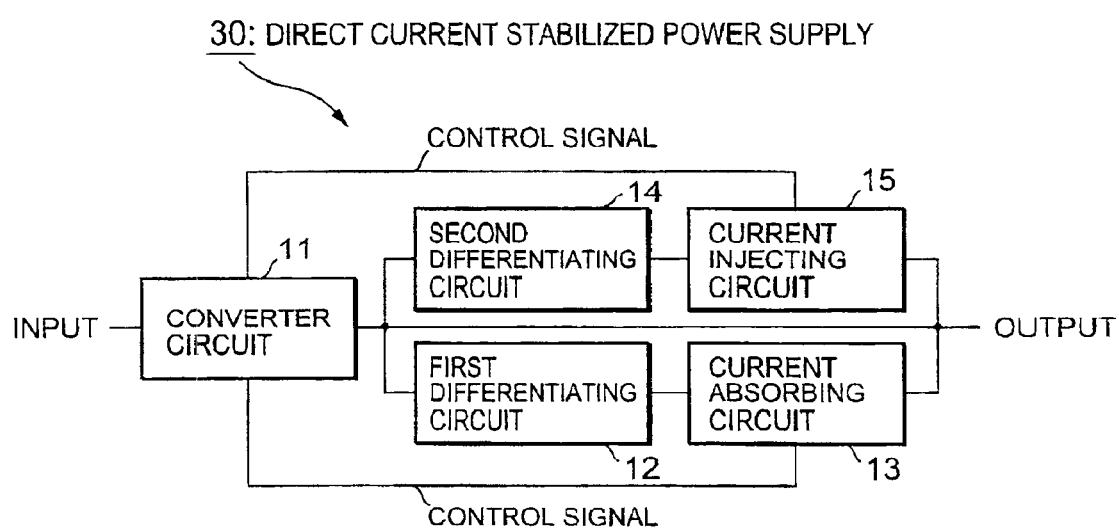
FIG. 3 is a schematic block diagram for showing a composition of a DC stabilized power supply according to a third embodiment of the present invention.

Next, referring to FIG. 3, description will proceed to a DC stabilized power supply according to a third embodiment of the present invention. In FIG. 3, illustrated is a composition of the DC stabilized power supply according to the third embodiment of the present invention.

The DC stabilized power supply 30 shown in FIG. 3 has a structure similar to that of the DC stabilized power supply 10 shown in FIG. 1 except for some points described below. Therefore, similar portions are numbered by like reference numerals, and description about the similar portions is omitted accordingly.

In FIG. 3, the DC stabilized power supply 30 has a composition in which control signals, that is, a start signal and a stop signal are transmitted from the converter circuit 11 to the current absorbing circuit 13 and the current injecting circuit 15, respectively, when the DC stabilized power supply 30 is starting or stopping.

Further, the current absorbing circuit 13 and the current injecting circuit 15 are composed to stop operations thereof during a predetermined time, when the above-mentioned control signals are inputted from the converter circuit 11.

According to the above-mentioned composition of the DC stabilized power supply 30, in the same manner as the DC stabilized power supply 10 illustrated in FIG. 1, when the DC power supply voltage is inputted to the converter circuit 11 from the outside thereof, the converter circuit 11 converts the inputted DC power supply voltage into a predetermined DC voltage and supplies the DC voltage to the output thereof. When the load current of the load connected to the output thereof fluctuates abruptly, transient rise or drop of the output voltage of the converter circuit 11 are detected by the first differentiating circuit 12 and the second differentiating circuit 14. As a result, the rise or the drop of the output voltage of the converter circuit 11 is suppressed by driving the current absorbing circuit 13 or the current injecting circuit 15 based on the output voltage of the first differentiating circuit 12 or the second differentiating circuit 14.

Further, in the DC stabilized power supply 30, even in the event that the output voltage of the converter circuit 11 fluctuates, when the DC stabilized power supply 30 is starting or stopping, the current absorbing circuit 13 and the current injecting circuit 15 stop operations thereof during a predetermined time. This is because the control signal, that is, a start signal or a stop signal is transmitted from the converter circuit 11 to the current absorbing circuit 13 and the current injecting circuit 15, respectively. Therefore, the current absorbing circuit 13 or the current injecting circuit 15 is never subjected to malfunction, even though the fluctuation of the output voltage of the converter circuit 11 at the starting time or the stopping time is detected by the first differentiating circuit 12 or the second differentiating circuit 14.

As described above, according to the present invention, transient fluctuations of the output voltage of the converter circuit 11 are detected by the first differentiating circuit 12 and the second differentiating circuit 14, when the load current of the load connected to the output of the DC stabilized power supply fluctuates abruptly. Then, the current absorbing circuit 13 or the current injecting circuit 15 are driven based on the output voltage corresponding to the above-mentioned fluctuations output from the first differentiating circuit 12 and the second differentiating circuit 14. Thus, even in the event that the load current varies abruptly and the output voltage of the converter circuit 11 varies transiently, the fluctuations of the output voltage of the converter circuit 11 are detected by the first differentiating circuit 12 and the second differentiating circuit 14. Further, the current absorbing circuit 13 or the current injecting circuit 15 is driven by the output voltage of the first differentiating circuit 12 and the second differentiating circuit 14 based on magnitude of the fluctuations. Therefore, the output voltage of the converter circuit 11 can be suppressed.

What is claimed is:

1. A DC stabilized power supply for use in converting an inputted DC power supply voltage into a predetermined DC voltage, comprising:

a DC-DC voltage converter circuit for converting an inputted DC power supply voltage into a predetermined DC voltage supplied on an output of the converter circuit, the output of the DC-DC voltage converter circuit being distinct from the input of the DC-DC voltage converter circuit;

a first differentiating circuit for differentiating variations in an output voltage of said converter circuit;

a current absorbing circuit driven by an output voltage of said first differentiating circuit;

a second differentiating circuit for differentiating variations in the output voltage of said converter circuit; and a current injecting circuit driven by an output voltage of said second differentiating circuit, an output of the current injecting circuit being connected to the output of the DC-DC voltage converter circuit, and an output of the current absorbing circuit being connected to the output of the voltage converter circuit.

2. A DC stabilized power supply as claimed in claim 1, wherein said converter circuit outputs a control signal to said first differentiating circuit or said second differentiating circuit to stop an operation of said first differentiating circuit or said second differentiating circuit, when said DC stabilized power supply is starting or stopping.

3. A DC stabilized power supply as claimed in claim 1, wherein said converter circuit outputs a control signal to said current absorbing circuit to stop an operation of said current absorbing circuit, when said DC stabilized power supply is starting or stopping.

4. A DC stabilized power supply as claimed in claim 1, wherein said converter circuit outputs a control signal to said current injecting circuit to stop an operation of said current injecting circuit, when said DC stabilized power supply is starting or stopping.

* * * * *